United States Patent [19]
Webb et al.

[11] Patent Number: 5,216,504
[45] Date of Patent: Jun. 1, 1993

[54] AUTOMATIC PRECISION VIDEO MONITOR ALIGNMENT SYSTEM

[75] Inventors: James R. Webb; Ron C. Simpson; Howard M. Pogoda, all of Boulder, Colo.

[73] Assignee: Display Laboratories, Inc., Boulder, Colo.

[21] Appl. No.: 766,646

[22] Filed: Sep. 25, 1991

[51] Int. Cl.⁵ ............................................. H04N 17/04
[52] U.S. Cl. ..................................... 358/139; 358/10
[58] Field of Search ................................. 358/10, 139

[56] References Cited

U.S. PATENT DOCUMENTS

| | | | |
|---|---|---|---|
| 4,240,100 | 12/1980 | Gorbold et al. | 358/10 |
| 4,602,272 | 7/1986 | Duschl | 358/10 |
| 4,989,072 | 1/1991 | Sato et al. | 358/10 |
| 5,032,769 | 7/1991 | Kawakami | 358/139 X |
| 5,036,251 | 7/1991 | Lee | 358/10 X |

*Primary Examiner*—Victor R. Kostak
*Attorney, Agent, or Firm*—Duft, Graziano & Forest

[57] ABSTRACT

An automatic precision video monitor alignment and calibration system is described which functions to precisely align all of the adjustable display characteristics of a video monitor to a high degree of precision. This alignment system can function in an automated calibration mode wherein it is independent of human input and automatically performs a series of alignment/calibration operations to precisely adjust all of the display characteristics of the video monitor in a fraction of the time required by a person to manually align the video monitor. The alignment system includes a digital control circuit located within the video monitor to precisely set and maintain each of the monitor display characteristics. The values maintained by this control circuit can be input by a person, or set automatically by a computer controlled display alignment system. The system of the present invention uses a single camera and a color analyzer to make all the measurements necessary to automatically align and calibrate a video monitor. The measurements are then used to make the adjustments, via the digital control circuit, necessary for alignment and/or calibration. A calibration computer coupled with a video coprocessor subsystem accomplish all adjustments to the monitor automatically, without the need for human intervention.

31 Claims, 10 Drawing Sheets

AUTOMATIC PRECISION VIDEO MONITOR ALIGNMENT SYSTEM

FIELD OF THE INVENTION

This invention relates generally to video monitors, including video display terminals and broadcast television sets, either with direct view or projection screens, and in particular, to a system for automatically and precisely calibrating and aligning the display characteristics of a video monitor using mechanical or digital display control circuitry.

PROBLEM

It is a problem in the field of video monitors to precisely control all the various display characteristics of a video monitor. There are numerous display characteristics of a video monitor that must be controlled by the drive circuitry in order to produce an accurate representation of the input signal that is applied to the monitor. Many of these display characteristics require complex and interactive adjustments. A typical monitor is capable of regulating only a subset of these display characteristics and provides a fixed approximate adjustment for the remaining characteristics. Even with these limitations, it is difficult and time consuming to precisely align a video monitor by manually adjusting the display characteristics. The controls typically used to adjust these display characteristics involve variable resistors which are manually adjusted by the user or a craftsperson in order to produce a display that is acceptable to the end user/viewer of the monitor. It is difficult, even with a test pattern being displayed on the monitor, to manually achieve a high quality monitor "picture," on a consistent basis. This difficulty of manual adjustment is due to the interaction between the various adjustments and the variability of the person doing the adjustments. The problems of video monitor display adjustment are further increased when a video monitor such as the Display Laboratories, Inc. Microscan type monitor is to be adjusted. This type of monitor has digital control over geometry and color balance, which control is achieved through the use of waveforms generated by the novel digital control circuit of the present invention. The digital control circuit also provides a degree of control over monitor geometry not previously possible. However, with this higher degree of controllability comes the requirement of making more initial adjustments. The process of making these adjustments can be a significant cost factor in the production of monitors requiring many such adjustments. Thus, a need exists for enabling the rapid and efficient alignment/adjustment of these types of monitors on an assembly line.

Traditional assembly lines use human operators to make adjustments to monitors, based on subjective judgments. With the type of digitally controlled video monitors described herein, manual adjustment of these monitors will not suffice to provide an efficient means of monitor production. Furthermore, users of these monitors require a means of objective measurement to ascertain whether or not the monitors being delivered meet specifications. As specifications become more complex, the problems associated with assembly line operator fatigue and judgment error become acute, and it also becomes more difficult to determine whether a monitor meets a given set of specifications.

Current video monitor geometry measuring systems typically use an array of cameras to make their measurements. This genre of test equipment is effective for taking detailed and accurate measurements, but lacks the flexibility, cost effectiveness, and speed of set-up required of a factory automation system.

Given the above requirements for an automated monitor set-up system, a new system is needed to work in efficient accord with a video monitor and its associated component set as used in the present invention.

SOLUTION

The above described problems are solved and a technical advance achieved in the field by the automatic precision video monitor alignment and calibration system which functions to precisely align all of the adjustable display characteristics of a video monitor to a high degree of precision. This alignment/calibration system can function in an automated calibration mode wherein it is independent of human input and automatically performs a series of alignment/calibration operations to precisely adjust all of the characteristics of the video monitor in a fraction of the time presently required by an operator to manually align the video monitor. The alignment system includes a digital control circuit located within the video monitor to precisely set and maintain each of the monitor display characteristics. The values maintained by this control circuit can either be input by an operator, controlled by a feedback circuit internal to the monitor, or set by a computer controlled display alignment system. In all of these cases, the digital control circuit provides a level of precision and controllability of parameters heretofore unknown in the video monitor field.

Each of the display characteristics in a video monitor can be controlled by a control signal which regulates various display generation circuitry within the monitor. In the prior art, these control signals were analog signals whose magnitude was controlled by manually variable resistors. In the system of the present invention, digital memory is used to store information representative of the value desired for each signal characteristic. The outputs of this digital memory are used to drive a digital to analog converter to produce the necessary control signals. The use of a digital memory enables the circuit of the present invention to produce control signals of greater complexity than the previous analog control circuitry. In addition, by storing this information in digital form, it is more easily manipulated by automated test circuits, which are typically controlled by digital computers. Furthermore, the use of the digital control circuit provides a uniformity within the video monitor that allows large scale integration (LSI) techniques to be used to implement control circuitry for a large number of parameters which heretofore have not been controllable in video monitors.

The alignment system of the present invention has an efficient command language integrated into firmware used to control the monitor. Using a simple (wired or wireless) serial connection between the video monitor and calibration computer, commands can be sent to the video monitor and information retrieved therefrom, in response to a command or at the initiative of the monitor. This connection allows for adjustments to be made to the monitor display without the need for human participation. No mechanical adjusting mechanisms or screwdrivers are required. All adjustments are made as a result of commands sent directly to the monitor from the calibration computer.

Unlike prior art video monitor geometry measuring systems which typically use an array of cameras to make their measurements, the system of the present invention uses a single camera and a color analyzer to make all the measurements necessary to align and calibrate the monitor. The measurements are then used in calculations to make the automatic adjustments necessary for alignment and/or calibration. A calibration computer coupled with a video coprocessor subsystem accomplish all adjustments through serial communications with the monitor.

A cost effective and rapid means is thus provided for achieving all of the adjustments required in producing an aligned and calibrated monitor. All of this is accomplished in a fraction of the time required by human operators, and with a level of accuracy and repeatability not heretofore possible. Measurements taken during the alignment/calibration cycle also provide a means of objective quality control/assurance, production deviation analysis, and documentation for the system user.

DETAILED DESCRIPTION OF THE INVENTION

In video monitors, many static voltage adjustments are required within the display circuitry to control the quality and accuracy of the display. A number of other important voltage adjustments in video monitors are dynamic, and affect voltages that vary cyclicly and synchronously with the incoming image source. Prior art video monitor architectures typically made use of manually adjustable potentiometers to accomplish the static voltage adjustments. The time-variant (dynamic) voltages in these systems were generated in several different ways, each of which were expensive to implement and troublesome to accurately control. Therefore, in conventional video monitors, the quality of the output display is significantly compromised by the inability of the control circuitry and the person calibrating the video monitor to provide the accuracy required to generate a well-aligned display.

Figure 1:
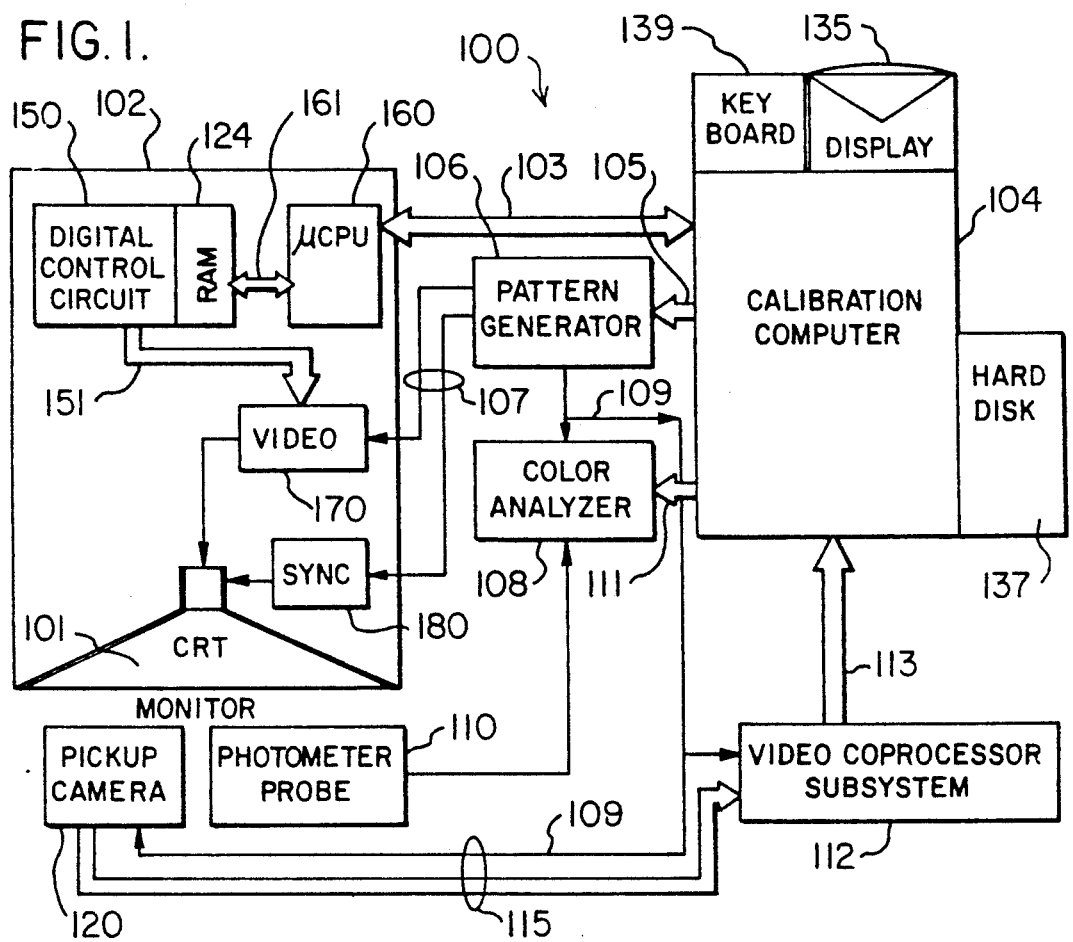
FIG. 1 illustrates in block diagram form the overall architecture of the automated test apparatus for aligning/calibrating video display terminals.

FIG. 1 illustrates in block diagram form the overall architecture of the automated test apparatus for aligning/calibrating video display terminals. The precision alignment system 100 of the present invention controls both the static and dynamic adjustments within a video monitor 102 by use of a standard format digital control circuit 150. The standard format digital control circuit 150 can operate under the control of a calibration computer 104 which is coupled to a video pickup camera 120 and a color analyzer 108 which obtain visual feedback from the video monitor 102. A preferred configuration is illustrated in FIG. 1, wherein a video pickup camera 120 is positioned in front of the video monitor 102 in a manner such that the pickup camera 120 can receive an image representative of the entire front of the video monitor 102.

The video pickup camera 120 is a solid state device which provides an analog signal representation of an image displayed on the cathode ray tube (CRT 101) of the monitor being aligned. In one embodiment of the present invention, the pickup camera 120 is a PANASONIC GP-MF 702. Internal switches in the camera are arranged to provide for the gating (synchronizing) necessary to view monitors of differing vertical sync frequencies. Specifically, the pickup camera 120 has been set for a double speed interlaced mode in order to capture two interlaced fields comprising a frame displayed on the CRT 101. The first of the two fields (e.g., the even traces) comprising the displayed frame is captured by the pickup camera 120 at an effective camera shutter speed of 1/120 of a second (twice the normal shutter speed), and sent to the video coprocessor subsystem 112, where it is stored. After the CRT retrace occurs, and the next frame is displayed on the CRT 101, the second of the two fields (e.g., the odd traces) is captured by the pickup camera 120 at a 1/120 second shutter speed, and stored by the coprocessor subsystem 112, which then combines the two fields into a single frame. This double speed capture is synchronized with the vertical sync frequency of the pattern generator 106, thus allowing the camera 120 to function with monitors having vertical sync frequencies higher than the standard broadcast NTSC frequency.

A color analyzer 108, also positioned in front of the monitor, is located next to the video camera 120. The color analyzer 108 is connected to the calibration computer 104 via serial communications link 111. The communications link 111 can use, for example, an IEEE 488 parallel bus protocol. The output of the pickup camera 120 is transmitted to the calibration computer 104 via a video coprocessor subsystem 112.

In one exemplary embodiment of the present invention, the calibration computer 104 is an Intel 80X86 IBM compatible computer with an ISA bus 113, 3 serial ports 103, 105, 111, and one parallel port (for a printer), a VGA display adaptor (not shown) and a compatible VGA display monitor 135, hard disk drive (20 MB or more) 137 nd keyboard 139. In one embodiment, the calibration computer may appear similar to a standard desk-top computer; however, it may also appear more like a piece of test equipment integrated into a cart or similar contrivance. Although any IBM compatible PC with an Intel 80×86 CPU and ISA bus will function as a calibration computer 104, an 80386 CPU is preferred. The calibration computer 104 uses the data produced by the pickup camera 120 and digitized by the video coprocessor subsystem 112 to analyze the display extant on the video monitor 102. Images displayed on the monitor 102 being aligned are processed by the calibration computer 104.

A video graphics pattern generator 106 generates the patterns that are applied to the video monitor 102 to perform an automated video monitor 102 calibration process. Since the video monitor 102 makes use of a large number of both fixed and time variant voltages which are locked in rigid synchronism with signal sources (typically, the horizontal and vertical sync) and which control the timing of an image that is to be displayed, the calibration computer 104 must individually adjust the control circuit 150 associated with each of these fixed and time variant voltage signals. The use of a digital control circuit 150 enables the calibration computer 104 to set values with a high degree of precision for each of these fixed and time variant voltage signals. By applying a series of predetermined test patterns to the input of the video monitor 102, the calibration computer 104 can adjust the various signal generation circuits within the video monitor 102. The calibration computer 104 controls the monitor being adjusted via serial link 103 using standard RS-232 protocol. All adjustments to registers and digital control circuitry 150 in the video monitor 102, as well as queries about current monitor states are made over this link 103.

The visual output provided by the video monitor 102 and received by the pickup camera 120 and color analyzer 108 is used by the calibration computer 104 to establish digital values for each of the control registers connected to the digital control circuit 150 contained within the video monitor 102. These control registers contain values used to adjust each of the parameters which affect the quality and accuracy of the display output. The calibration computer 104 controls the graphics pattern generator 106 via a serial link 105 using standard RS-232 protocol. Different patterns (described below) are selected during the alignment and color balance procedures. The graphics pattern generator 106 is a device which can be programmed to display different patterns at different horizontal and vertical frequencies on the monitor. The graphics pattern generator 106 is controlled via serial connection 105 to the calibration computer. A CHROMA 2000 programmable graphics pattern generator 106 is employed in one embodiment of the present invention. The graphics pattern generator 106 sends selected test patterns to the monitor CRT 101 via an RGB output to the monitor via cable 107. The graphics pattern generator 106 must also send a synchronizing signal to the color analyzer 108 and the video coprocessor subsystem 112 so that measurements can be synchronized with the images as they are displayed and refreshed. The synchronizing signal from the pattern generator 106 is sent to the pickup camera 120, the color analyzer 108, and the video coprocessor subsystem 112 on cable 109, and to the monitor sync circuit 180 over cable 107. Link 103 is connected to a microprocessor 160, for example, a Motorola 68HC11, which handles communications between the calibration computer 104 and the digital control circuit 150, the outputs from which are connected to the monitor video circuit 170 via cable 151. The monitor microprocessor 160 is connected to digital control circuit RAM memory 124 via data and address buses 161 (collectively indicated). Both the monitor sync circuit 180 and the monitor video circuit 170 are connected to the monitor CRT 101 by means well known in the art.

During the color balance procedure (described below), the calibration computer 104 communicates with the color analyzer 108 via serial link 111 using standard RS-232 protocol. The color analyzer 108 reports via a serial connection 111 to the calibration computer, the red, green, and blue components of a given compound color. A MINOLTA CRT 101 Color Analyzer 108 Model CA-100 with optional Memory Card is used in one embodiment of the present invention. During the alignment procedure described below, the calibration computer 104 downloads a set of target color coordinates and intensity levels to the color analyzer 108. The color analyzer 108 then sends back, to the calibration computer 104, the inverse of the percentage of error from target to the calibration computer 104 via a serial link 111. The color analyzer 108 uses its photometer probe 110 to make color temperature measurements of the monitor's video display.

During the geometry set-up/alignment operation, the calibration computer 104 communicates with the video coprocessor subsystem 112 via an ISA bus 113. The video coprocessor subsystem 112 communicates with the video camera 120 via cable 115. The video coprocessor subsystem 112 is comprised of a microcomputer device connected to the calibration computer and attached to the ISA bus 113. This device receives the signals from the video pickup camera 120 and stores them for processing. The on-board coprocessor 112 executes the instructions necessary to accomplish the measurements requested by the calibration computer 104 and returns the results to the calibration computer. The video coprocessor subsystem 112 offloads the burden of moving large blocks of memory and performing calculations requested by the calibration computer. A Texas Instrument 34010 CPU is used, in one embodiment of the present invention, as the coprocessor. The video coprocessor subsystem 112 also performs the digitizing of the output 115 from the pickup camera 120.

The video coprocessor subsystem 112 is synchronized with the monitor's display through communication with the graphics pattern generator 106 via cable 109. The synchronizing signal provides for a virtual shuttering mechanism in the camera 120. Instead of actually using an LCD or a mechanical shutter, the system 100 of the present invention synchronizes the video camera's circuitry to effectively capture a single "frame" displayed on the monitor's CRT 101 display.

Effective synchronization of camera 120 and displayed image is accomplished by (1) using the vertical sync signal from the pattern generator 106 to synchronize the video coprocessor subsystem 112 with an image displayed on the monitor's CRT 101, and (2) capturing each of the fields constituting the displayed image at a shutter speed of 1/120 of a second. This insures that each captured frame is accurately recorded, regardless of the speed (due to differing vertical sync rates for different monitors) at which the frame was "painted" on the CRT 101. This degree of capture accuracy allows enhanced resolution of displayed images which exceeds the physical array dimensions of the video camera 120 being used. The enhanced resolution is achieved through use of interpolation and dither algorithms described below. It should be noted, that in contrast to the prior art which required the use of a multiple camera array, the system of the present invention uses a single camera to make the geometry measurements necessary to align and calibrate the monitor 102.

FUNCTIONAL DESCRIPTION OF THE AUTOMATIC MONITOR ALIGNMENT SYSTEM

The automatic video monitor 102 alignment system 100 of the present invention consists of a video monitor 102 and two main functional subsystems, the color balance subsystem and the geometry/alignment subsystem.

The video monitor 102 used in a preferred embodiment of present invention contains a plurality of hardware control registers connected to a digital control circuit 150. A monitor suitable for use in a preferred embodiment of the present invention is a Display Laboratories, Inc. "Microscan" color monitor. The control registers in this monitor store data values used to control various display characteristics of the monitor. Data stored in a given control register is accessed by a digital control circuit 150 which converts the stored data to an analog signal in synchronism with the horizontal/vertical sync of the video monitor 102. The analog signal is then applied to the appropriate CRT 101 input.

Figure 2:
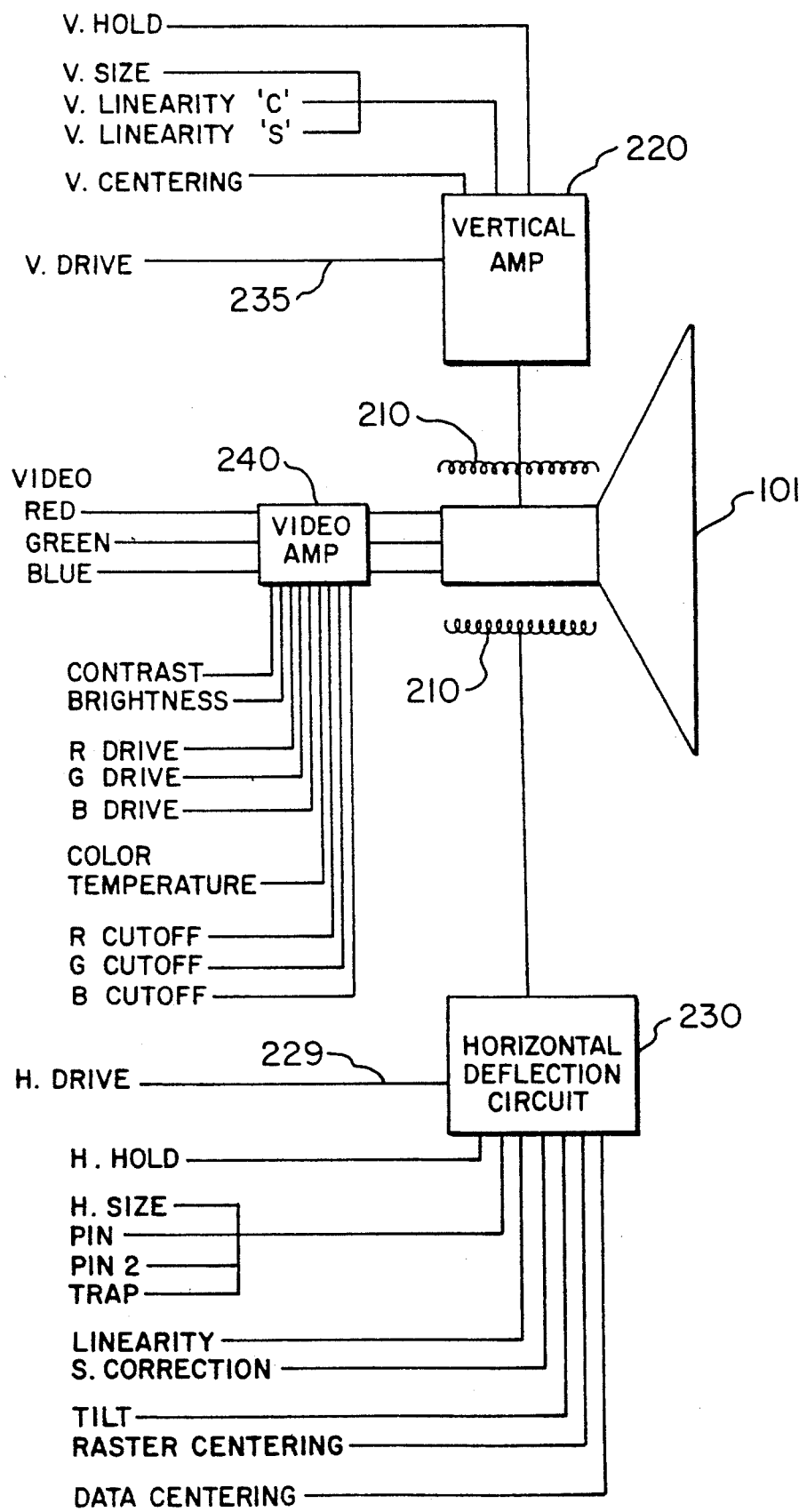
FIG. 2 illustrates a typical set of digitally controllable inputs in a video monitor having a digitally adjustable display.

FIG. 2 illustrates a typical set of digitally controllable inputs in a video monitor 102 having a digitally adjustable display. Each of these inputs (e.g., V. HOLD, V. SIZE, etc.) is connected, as shown in FIG. 2, to either the vertical amplifier 220, the video amplifier 240, or the horizontal deflection circuit 230. Both the vertical amplifier 220 and the horizontal deflection circuit 230 are connected to the yoke windings 210 of the monitor CRT 101 by means well known in the art. Each of the digitally controllable inputs is responsive, via the digital control circuit 150, to data stored in a corresponding digital circuit control register within the video monitor 102. As an example, if an increase in the vertical size of the CRT 101 display is desired, then the existing value in the Vertical Size register (not shown) corresponding to the V. SIZE (vertical size) input of the CRT 101 is incremented accordingly. The incrementing of this particular register is typically accomplished by a signal input from the calibration computer 104, although registers corresponding to conventional user-adjustable inputs, such as brightness and contrast, are also manually adjustable. A register adjustment input from the calibration computer 104 includes specifying the V. SIZE register as a target register as well as an appropriately incremented target register value, which input is stored in the target (V. SIZE) register. The digital control circuit 150 then utilizes this newly stored value in the V. SIZE register to change the vertical size of the image being displayed on the monitor CRT 101.

It is to be expressly understood, however, that other types of monitors not having a digital control capability may also be aligned by the method of the present invention. For example, a robotically controlled screwdriver may be used to adjust analog potentiometers in a conventional video monitor. The color balance subsystem used by the present invention provides an automated means to set selected color temperatures for a given monitor 102. This functional component of the alignment system 100 allows a technician to select a color temperature (or several color temperatures, if the monitor is capable of storing more than one set of color values). The color balance subsystem automatically programs the monitor 102 with the values which will achieve the selected color temperature(s).

The geometry/alignment subsystem of the present invention provides an automated means to align the monitor 102. Geometry/alignment involves such common adjustments as: Pincushion, Keystone, Vertical and Horizontal Size and Position, and Linearity. This functional component of the alignment system 100 allows a set of values relating to picture size and acceptable error limits to be entered into a table. The geometry/alignment subsystem then automatically makes all adjustments to the monitor to achieve the desired values, based on entries in the table.

Functionally, the automatic alignment system 100 is best understood by analyzing the subsystems separately.

COLOR BALANCE SUBSYSTEM

To allow for accurate tracking of color temperature at any brightness or contrast setting, 12 adjustments are made for each desired color temperature. These are divided into 4 groups of Red, Green, and Blue. They are: Brightness Maximum, Brightness Minimum, Contrast Maximum and Contrast Minimum. The amount of red, green, and blue in each of these four categories must be carefully set for the proper color temperature. By setting the minimum and maximum values, the color temperature will theoretically track accurately anywhere in-between.

The color balance procedure is comprised of the following steps:

Set the Brightness register to maximum;

Download the target color coordinates and level to the color analyzer 108 for the brightness maximum adjustment;

Enter into the adjustment loop subroutine (described below) for brightness maximum until the desired level of accuracy has been achieved, or the monitor has been determined to be incapable of proper adjustment. If the monitor can be adjusted, proceed to the next step, else fail the monitor;

Download the target color coordinates and level to the color analyzer 108 for the contrast maximum adjustment;

Set the Contrast register to maximum;

Enter into the adjustment loop subroutine for contrast maximum until the desired level of accuracy has been achieved, or the monitor has been determined to be incapable of proper adjustment. If the monitor can be adjusted, proceed to the next step, else fail the monitor;

Download the target color coordinates and level to the color analyzer 108 for the brightness minimum adjustment;

Set the Brightness register to a low level, just above zero (typically 16, on a scale of 255), which provides the minimum necessary brightness level for subsequent adjustment;

Enter into the adjustment loop subroutine (below) until the desired level of accuracy of "brightness minimum" has been achieved, or the monitor has been determined to be incapable of proper adjustment. If successful, proceed to the next step, else fail the monitor;

Set the Contrast register to minimum;

Download the target color coordinates and level to the color analyzer 108 for the contrast minimum adjustment;

Enter into the adjustment loop subroutine until the desired level of accuracy of "contrast minimum" has been achieved, or the monitor has been determined to be incapable of proper adjustment. If successful, exit this procedure, else fail the monitor.

[End of color balance procedure main routine]

ADJUSTMENT LOOP SUBROUTINE

Iterate the following steps until adjustment is achieved or monitor has been determined to fail. Each iteration consists of the calibration computer 104 executing the steps in the following loop:
determining if the target adjustment has been achieved;
if the target adjustment has been achieved, then exit;
if not, determining whether monitor has failed to make the target adjustment;
  if the monitor has failed, then exit.
  if the monitor has not failed, conducting the following steps:
    reading the input from the color analyzer 108 to determine the degree of error;
    calling a function which returns a corrected value (for each of the three color registers being adjusted (red, green, and blue) based on the degree of error;
    downloading the corrected register value to the monitor;
    continuing at top of loop (determining if target adjustment has been achieved).

The color balance procedure basically includes adjusting the registers corresponding to the red, green, and blue color guns in the CRT 101 to produce the desired temperature of white. During each adjustment iteration, the percentage of target color temperature value achieved is read by the color analyzer, and transmitted to the calibration computer 104. A compensatory change to all three colors is sent to the monitor 102 by the calibration computer 104. The monitor 102 then makes a proportional change in the corresponding color outputs to the CRT 101. This procedure is repeated until the desired color temperature, as determined by the calibration computer 104, is obtained.

GEOMETRY/ALIGNMENT SUBSYSTEM

The geometry/alignment subsystem uses novel machine vision algorithms to make measurements and adjustments to the monitor. The video camera 120 typically sends analog signals representative of the image displayed on the monitor CRT 101 to the video coprocessor subsystem 112. A 120th of a second "frame" of this image is captured by the pickup camera 120, and digitized and stored in on-board memory by the video coprocessor subsystem 112. A resultant frame containing a fully painted static image on the CRT 101 is obtained by combining (re-interlacing) the odd and even constituent fields, each captured from one of two successively displayed frames, both of which were captured at an effective shutter speed of 1/120 of a second. Successful capture and recombination of the two fields is due to the fact that sync signals from the graphics pattern generator 106 are fed to both the video monitor 102 and the video coprocessor subsystem 112. The video camera 120 signals are digitized in such a way as to represent each pixel as an 8 bit value representing 1 of 256 possible grey-levels. The video camera 120 thus presents to the video coprocessor subsystem 112 a frame consisting of, for example, a 640 by 480 pixel array. Once a frame has been captured, the calibration computer 104 applies novel "recognition" algorithms to the video array to determine the position, size and shape of objects located in the frame/video array.

The video coprocessor subsystem 112 does not use conventional image processing algorithms such as convolution, histogram brightening, or kodalith. While these techniques enhance the human eye's ability to recognize images, they result in a distortion of information. Instead, the coprocessor subsystem 112 of the present invention applies novel algorithms to determine the position, size and shape of objects displayed on the video monitor 102 CRT 101. After an object has been recognized and located, interpolation and dithering techniques are then applied to further refine the measurements thereof.

The following procedures represent the algorithms used by the present invention to recognize basic objects and their shapes and locations:

EDGE DETECTION

The system 100 of the present invention automatically aligns the geometry of the monitor being tested by detecting edges of rectangular "boxes". First, a pattern containing a plurality of boxes is generated by the pattern generator 106 and displayed on the monitor CRT 101. Next, the video pickup camera 120 captures an image of the displayed pattern, which image is then digitized and stored as a video array. Each pixel in the video array is represented by a byte of video coprocessor subsystem 112 memory having a value between 0 and 255, where the value corresponds to one of 256 possible levels on a grey scale. In order to locate the edge of a box, a pixel having a predetermined sufficient intensity is searched for along the x axis of the video array. When such a pixel is found, search continues along the x axis of the video array, counting pixels, until the pixel intensity level drops significantly. If the width, as determined from the pixel count, is within predetermined box size limits, the search and pixel counting is then renewed along the y axis. This second measurement is made from the x axis location where the suspected box begins, and at the edge of the display, for the y axis. If the depth of the box is within the box size limits, a box has been located and measured. Two different algorithms are employed by the present invention to detect edges of objects in the video array, depending on the resolution of measurement and accuracy of adjustment required: (1) an "absolute difference" algorithm, and (2) a "reference comparison" algorithm using interpolation. Selection of the appropriate edge detection algorithm is also a function of the range and precision of the controls available on the particular type of monitor being adjusted.

ABSOLUTE DIFFERENCE EDGE DETECTION

Figure 3:
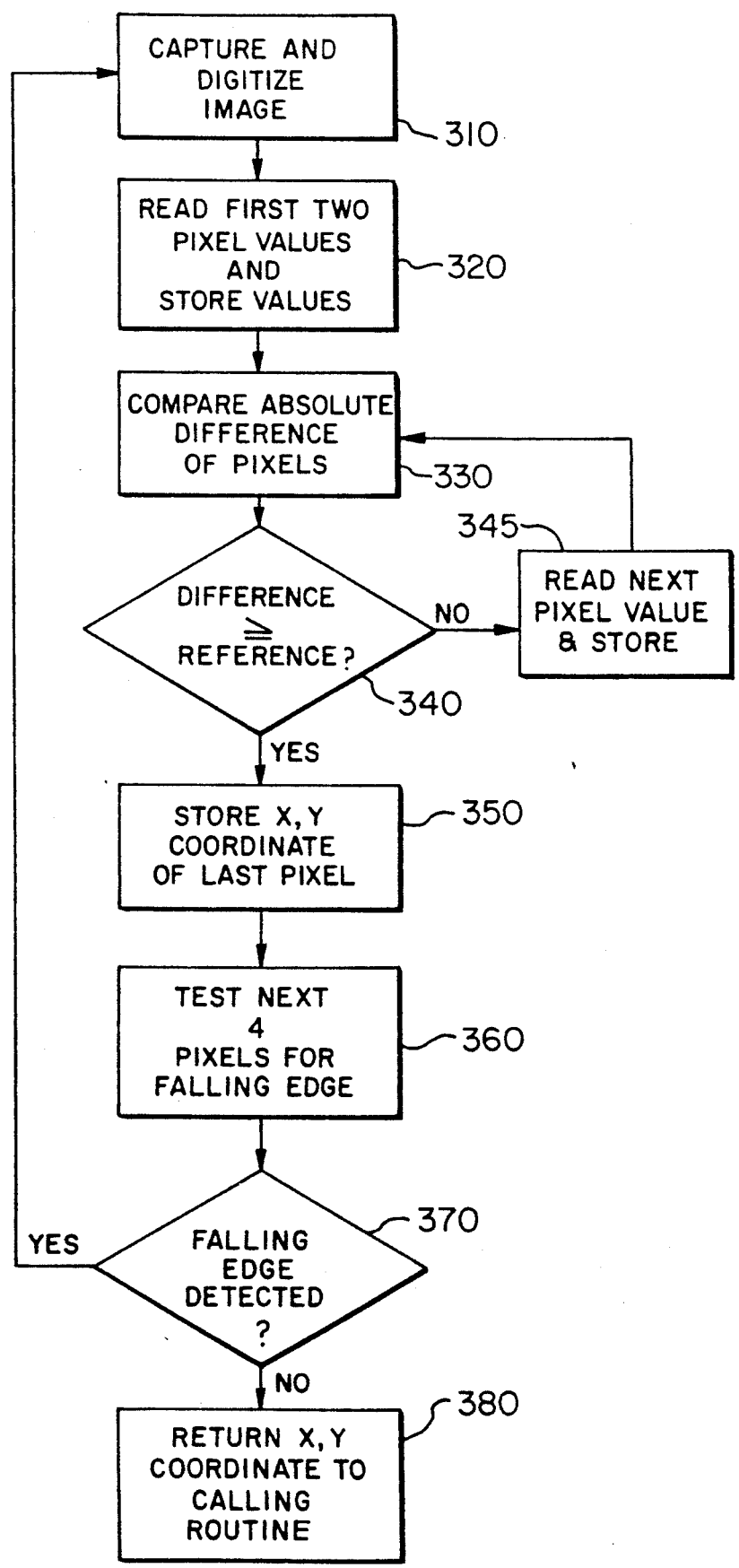
FIG. 3 is a flow chart of a first algorithm used by the present invention to locate the edge of an object displayed on a video monitor.

FIG. 3 is a flow chart of a first algorithm used by the present invention to locate the edge of an object displayed on a video monitor 102. At step 310, an image displayed on the monitor CRT 101 is captured and digitized. Starting from a given point (as determined for a particular measurement described below), at step 320, a first pixel value is read and stored, and the value of the next pixel along a given axis in a given measurement direction is also read and stored. At step 330, the absolute difference of the two pixel values is compared to a reference value. If the difference is greater than or equal to the reference value, at step 340, then an edge has possibly been detected, and, at step 350, the x,y video array coordinates of the last encountered pixel are stored. Otherwise, if the difference is less than the reference value, then at step 345, the value of the next pixel along the present measurement axis is read and stored.

Next, at step 360, filtering for noise is applied to the possible edge. The next four pixels along the present axis and in the present measurement direction are measured to determine whether a falling edge, i.e., a pixel having a less-than-reference value, is detected. If, at step 370, a falling edge is detected, then the determination is discarded and a new capture and measure cycle is initiated, at step 310. Otherwise, if no new edge is detected, then, at step 380, the original edge is determined to be valid, and the x,y coordinates thereof are returned as stored in step 350.

EDGE DETECTION USING REFERENCE COMPARISON AND INTERPOLATION

Figure 4:
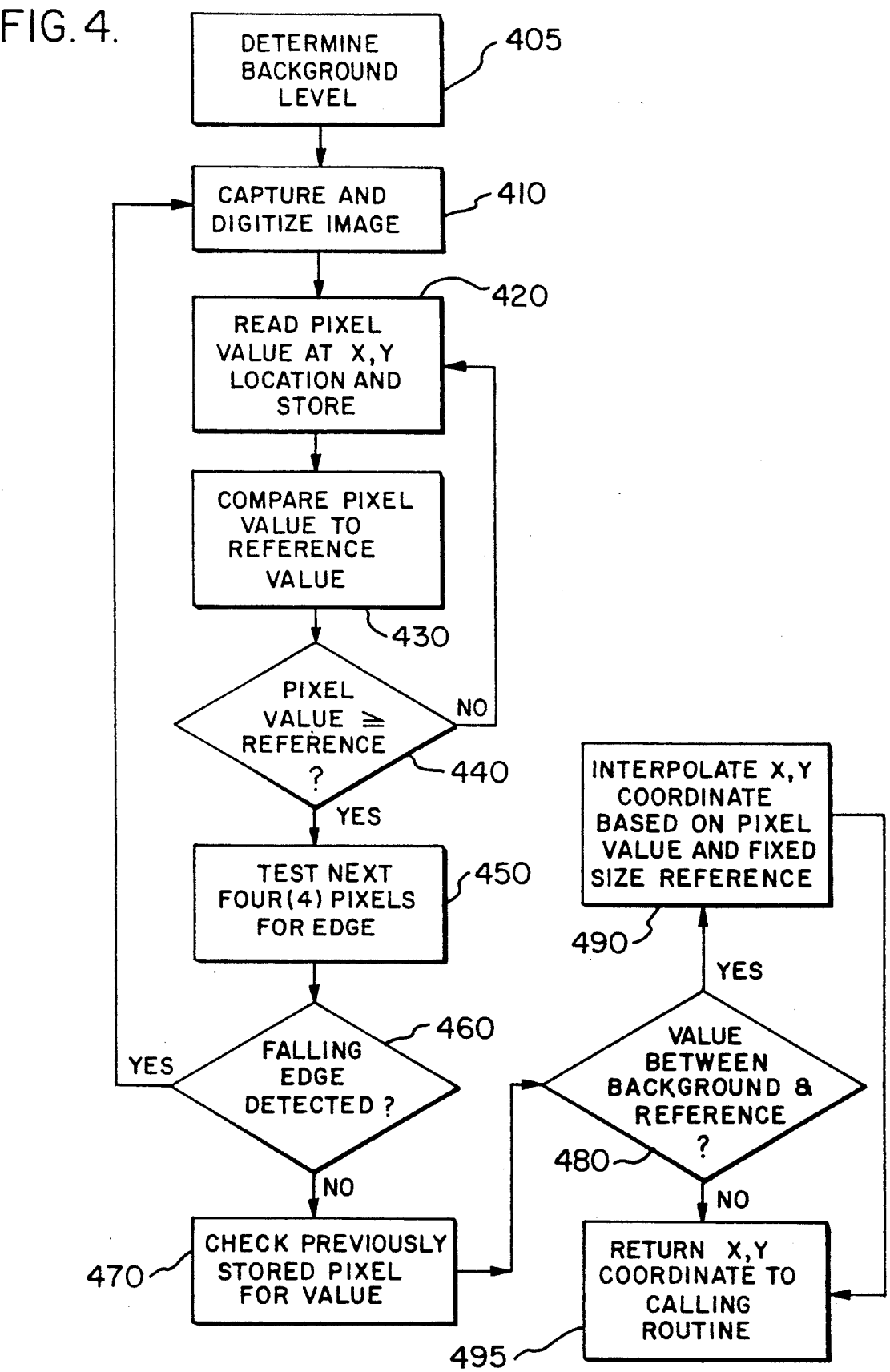
FIG. 4 is a flow chart of a second algorithm used by the present invention to locate the edge of an object displayed on a video monitor.

FIG. 4 is a flow chart of a second algorithm used by the present invention to locate the edge of an object displayed on a video monitor 102. This algorithm uses a reference pixel value to make a coarse determination of the location of an edge of a pattern being displayed on the monitor CRT 101. In addition, interpolation between adjacent pixel intensities is employed to enhance the resolution of the image received by video pickup camera 120. Referring to FIG. 4, at step 405, the CRT background brightness level is determined. This is accomplished by reading (via the camera 120), digitizing (by the video capture and coprocessor subsystem 112) and storing (in the calibration computer 104) the value of a pixel located near the center of the CRT, with the monitor contrast and brightness being set to minimum values. At step 410, an image is displayed on the monitor CRT 101, which image is then is received and digitized. Starting from a given point (as determined for a particular measurement described below), at step 420, the intensity of the pixel at that point is read and stored in the calibration computer 104. At step 430, the stored value is compared to a previously determined reference pixel value, typically 200 (which is indicative of a CRT brightness of approximately 24 footlamberts). If, at step 440, the stored value is less than the reference value, then returning to step 420, the next pixel along the present axis and in the present measurement direction is read. If, however, the stored value of the pixel measured at step 420 is equal to or greater than the reference value, then an edge has possibly been detected, and at step 450, noise filtering is applied to the possible edge. The next four pixels along the present axis and in the present measurement direction are measured to determine whether a falling edge, i.e., whether a pixel having a less-than-reference value is detected. If, at step 460, a falling edge is found, then the determination is discarded and a new capture and measure cycle is initiated, at step 410. Otherwise, if no new edge is detected, then at step 470, the value of the pixel previously stored at step 420 is retrieved, and an edge is determined to have been found.

At step 480, it is determined whether the stored value of the pixel measured at step 420 is between the background value and the reference value. If so, at step 490, interpolation of the present and previous pixel values is performed. The resulting linearly interpolated value is then normalized with respect to the reference value, to arrive at the distance of the detected edge from the center of the boundary between the pixels. For example, assume that the left edges of the two pixels are 5 mm apart, and the pixel measurement is proceeding from right to left. If the pixel previously stored (at step 420, before detection of the edge) has a value of 50% of the reference value, then the edge is determined to be located at a point 2.5 mm to the right of the boundary between the two pixels.

If, the value of the pixel stored at step 420 is equal to the background value, then, at step 495, the x,y coordinate of the present pixel is returned to the calling routine. No interpolation is required because no part of the detected edge is contained within the previous pixel.

LOCATE VIRTUAL BEZEL

Figure 6:
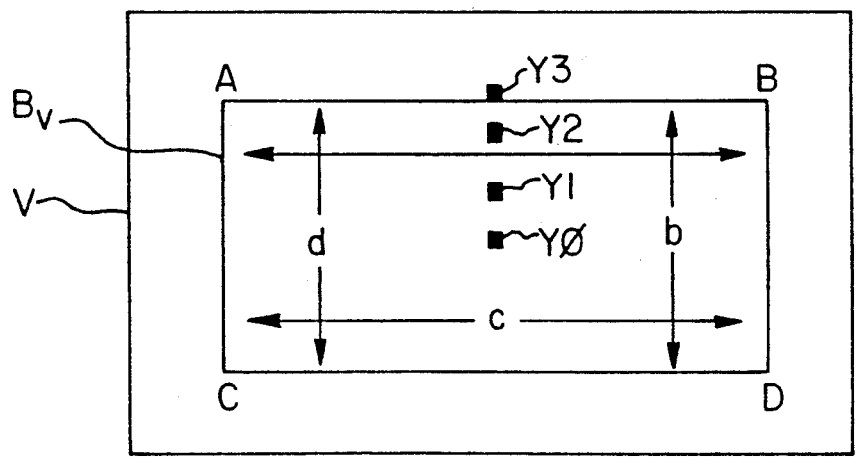
FIG. 6 shows a video camera view of the monitor's CRT display wherein the virtual bezel is being located with respect to the image captured by the video camera/coprocessor subsystem.
Figure 5:
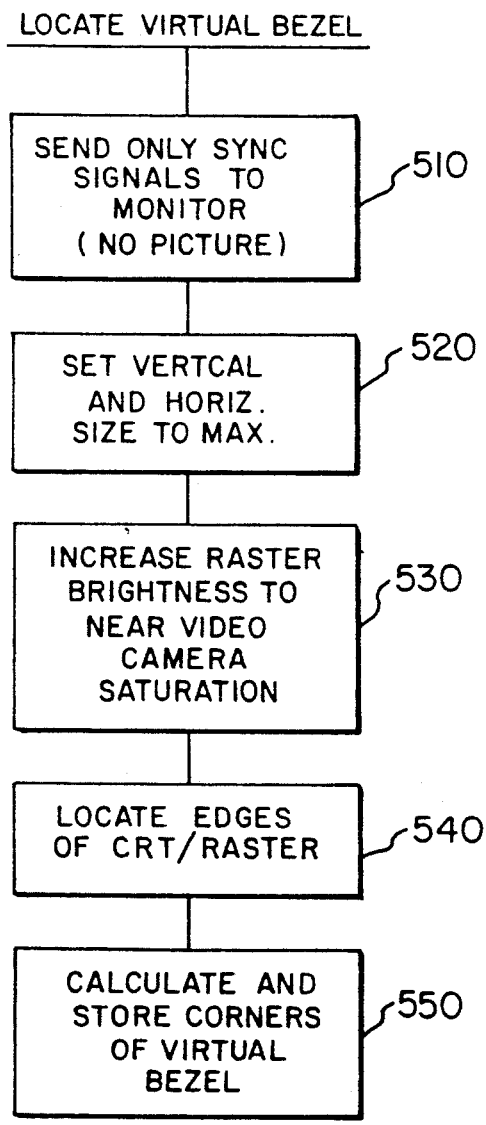
FIG. 5 is a flow chart showing a method used for locating a "virtual" bezel on a monitor having a physical bezel.

FIG. 5 is a flow chart of the procedure used by the present invention to locate the "virtual" bezel $B_v$ of the video monitor 102 being aligned (calibrated), wherein the monitor does not actually have a bezel physically attached. The term "virtual bezel" is used because a given monitor may or may not have a physical bezel encompassing the edges of the CRT 101 at the time the monitor is being adjusted. FIG. 6 shows a video camera view of the monitor's CRT display wherein the virtual bezel $B_v$ is being located with respect to the image captured by the video camera/coprocessor subsystem 112. The rectangle V represents the entire video array of the captured image. Y0 represents the center of the video array V, and also functions as the absolute center from which the location of all captured images are calculated.

At step 510, the calibration computer 104 signals the graphics pattern generator 106, via link 103, to send only sync signals to the monitor; thus a "null" pattern is sent to the monitor. At step 520, the vertical size and horizontal size registers in the monitor are set to maximum so that the raster extends as close as possible to the edges of the CRT 101. Next, at step 530, raster brightness increased until the raster on the monitor is bright enough to almost saturate the cells in the pickup camera 120. Raster brightness adjustment is accomplished by the calibration computer 104 sampling pixels near the center of the video array V and sending compensating signals to the appropriate monitor register. When the pixel levels near the center of the video array V reach a value of approximately 250 (on a scale of 255), raster brightness is properly set. Sampling and increasing raster brightness is continued until this value has been obtained. At step 540, the edges of the CRT 101 (illuminated by the raster) are located using the absolute difference method described above. The video array V is scanned from the center Y0 outward until an abrupt decrease or change in pixel intensity is measured. A change in pixel intensity of 20 is typically indicative of the edge of the raster. It is assumed that the edge of the raster is parallel to the edge of the CRT 101 and close thereto. Referring to FIG. 6, the video array V is scanned by the calibration computer 104 along the following lines: a, b, c, and d. Sides AB, BC, CD, and DA of the virtual bezel $B_v$ are thus located. At step 550, corners A, B, C, and D of the virtual bezel $B_v$ are calculated by extending the sides thus located, until intersection thereof occurs, because many bezels are curved at the corners. These corner values are then stored in calibration computer 104 memory.

Figure 7:
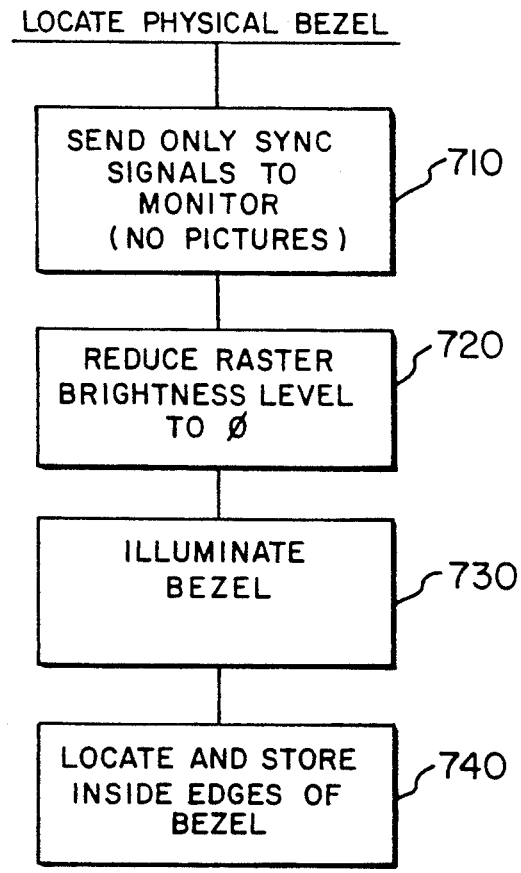
FIG. 7 is a flow chart of the procedure used by the present invention to locate the inside edges of a physical bezel of a video monitor.

Alternatively, if the monitor being adjusted has an actual (physical) bezel surrounding the CRT 101, then the following procedure is employed to locate the bezel. FIG. 7 is a flow chart of the procedure used by the present invention to locate the inside edges of the physical bezel of the video monitor 102 being adjusted. Note that the physical bezel, once located, is still termed a "virtual" bezel $B_v$, and treated as such, for purposes of consistency.

At step 710, the calibration computer 104 signals the graphics pattern generator 106, via link 103, to send only sync signals to the monitor (i.e., a null pattern is sent). Next, at step 720, "G2" (or "brightness" if the monitor being adjusted does not have a G2 adjustment) is reduced to a minimum value by transmission of a 0 value, by the calibration computer 104, to the monitor G2 register. At step 730, the bezel is illuminated with an external light source, typically a 60 watt incandescent light source positioned approximately the same distance from the monitor 102 as the pickup camera 120, and aimed so as to evenly illuminate all sides of the bezel. The contrast between the reflected light of the bezel, and the dark area of the CRT 101 provides the contrast necessary to locate the bezel/virtual bezel $B_v$.

At step 740, a camera image of the CRT bezel is captured and digitized. Each byte of the video array V as captured by the video coprocessor subsystem 112 contains a value of 0 to 255, representing one of 256 possible gray levels. The edge of the bezel is then determined as follows, using the absolute difference method described above. Starting at the midpoint in the video array (Y0) and measuring upwards (towards Y3) the value of a first pixel is read and stored, and the adjacent pixel value is then read. The absolute difference between the two pixel values is then compared (by the calibration computer 104) to a reference value which is typically greater than 20% of the pickup camera saturation value. When the difference between the two pixel values is equal to or greater than the reference value, an edge of the virtual bezel $B_v$ is determined to have been located.

In the present example, the value of the pixel located at Y0 is first read and stored. Here, it is assumed that Y0 has a value of 20, representing a comparatively dark area of the CRT 101. Next, adjacent pixel Y1 is sampled, in this case Y1 also having a value of 20. (Note that the spacing between pixels in FIG. 6 has been greatly exaggerated in order to simplify the present explanation.) The absolute difference between Y0 and Y1 is zero. Comparing this difference to a reference value, for example, 50, it is determined that an edge has not been found. A pixel counter is incremented. Next, Y1 is stored and Y2 is sampled. Assuming that Y2 also has a value of 20, the absolute difference (Y2−Y1) indicates that an edge still has not been found. The pixel counter is again incremented. Finally, Y3 is sampled and found to have a value of 220, since Y3 represents is a point on the reflective edge of the bezel. The absolute difference (Y3−Y2) is 200. This difference is greater than the reference value of 50, so an edge of the virtual bezel $B_v$ has been detected. Since the number of pixels from the center of the video array Y0 have been kept track of, the location of edge AB is thus known, and is stored in calibration computer 104 memory.

In like manner, virtual bezel dimensions BD, CD, and AC (as shown in FIG. 6) are determined and stored. All subsequent measurements for a given monitor are made relative to the virtual bezel $B_v$ location. Using this method, each monitor being adjusted does not need to be located in exactly the same location relative to the pickup camera 120. Such a feature is important on an assembly line where monitors travelling along a conveyer belt are stopped somewhere in front of the pickup camera 120 for alignment. The method of the present invention obviates the requirement that each monitor be placed at exactly the same location in front of the camera 120, and thus does not require that the conveyor be controllable within close tolerances. The calibration computer 104 determines if the virtual bezel $B_v$ is located within the video array V to the degree necessary to conduct accurate measurements. For example, the physical bezel may be too tilted, or beyond an edge of the video array V, thus not allowing proper measurements to be taken.

ADJUST RASTER

Figure 8:
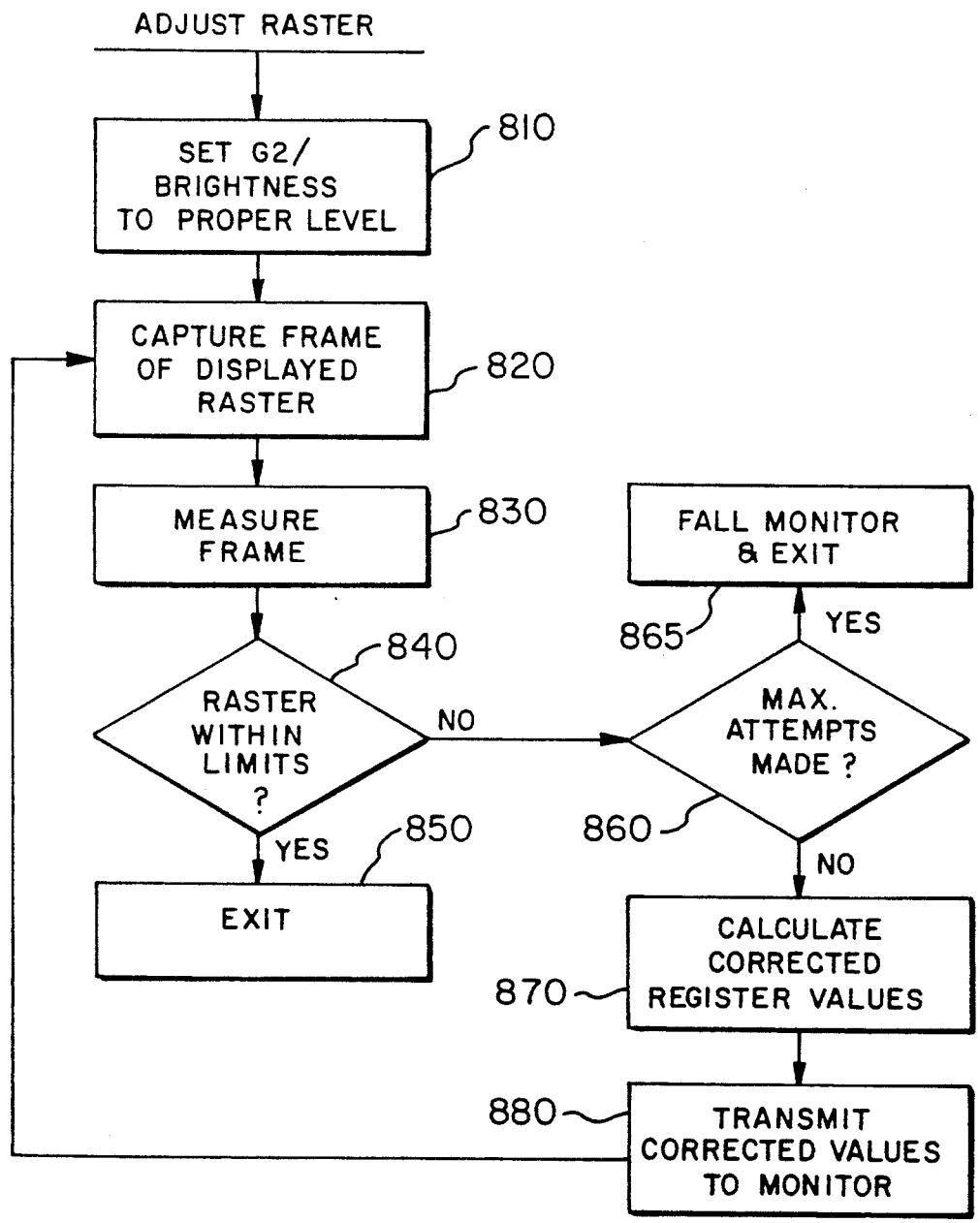
FIG. 8 is a flowchart showing the procedure used to center the raster with respect to the virtual bezel.
Figure 9:
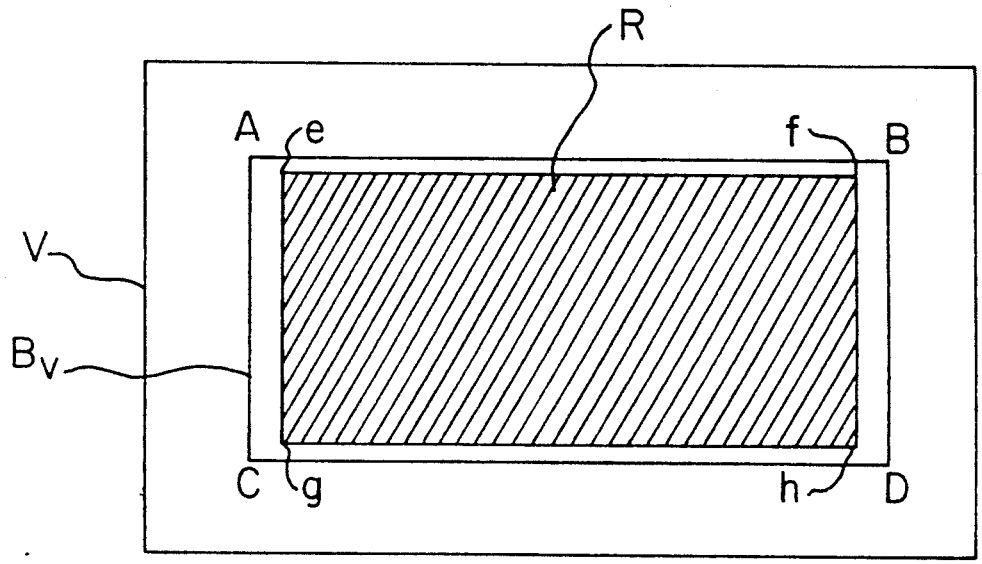
FIG. 9 is the pickup camera view of the monitor's CRT display wherein the raster is being adjusted with respect to the virtual bezel.

In order to center the raster with respect to the virtual bezel $B_v$, the auto-alignment software in the calibration computer 104 enters into a loop designed to adjust the raster to within proper limits. FIG. 8 is a flowchart showing the procedure used to center the raster with respect to the virtual bezel $B_v$. FIG. 9 is the pickup camera 120 view of the monitor's CRT display wherein the raster is being adjusted with respect to the virtual bezel $B_v$.

First, at step 810, G2 is set (or brightness and contrast is set if the monitor being adjusted does not have a G2 adjustment) until the raster on the monitor is somewhat below the saturation level of the pickup camera cells, typically 200 on a scale of 0 to 255. The raster, therefore, appears significantly brighter than the surrounding bezel, and is thus able to be located by virtue of this brightness differential. Next, at step 820, a frame of the displayed raster R (as delineated by the rectangle efgh in FIG. 9) is captured by the video camera 120. At step 830, the edges of the raster R (AB, BD, CD, and AC) are detected and measured using either the absolute difference or reference comparison method described above. At step 840, these edge measurements are compared with predetermined values to ascertain whether the raster edges are within acceptable tolerances. If the position of the raster R is within these acceptable tolerances, the loop is exited at step 850. If the raster R is not within the acceptable tolerances, then, at step 860, a check is made to determine whether an allowable maximum number of attempts to adjust the raster R have been made. If, after the allowable maximum number of attempts to adjust the raster R, the raster cannot be brought within the acceptable limits, the monitor is failed, at step 865.

Otherwise, at step 870, estimated corrected values are calculated for all monitor control registers that affect the size and shape of the raster R. Typically, Vertical Height, Vertical Center, Top Width, Horizontal DC Center, Center Width, Bottom Width, and Tilt registers are adjusted with each iteration of the raster adjustment loop. At step 880, the corrected register values are transmitted to the monitor. Returning to step 820, a new frame is captured and measured, and the raster adjustment loop is repeated.

ALIGN MONITOR USING RECTANGULAR PATTERNS

Figure 10:
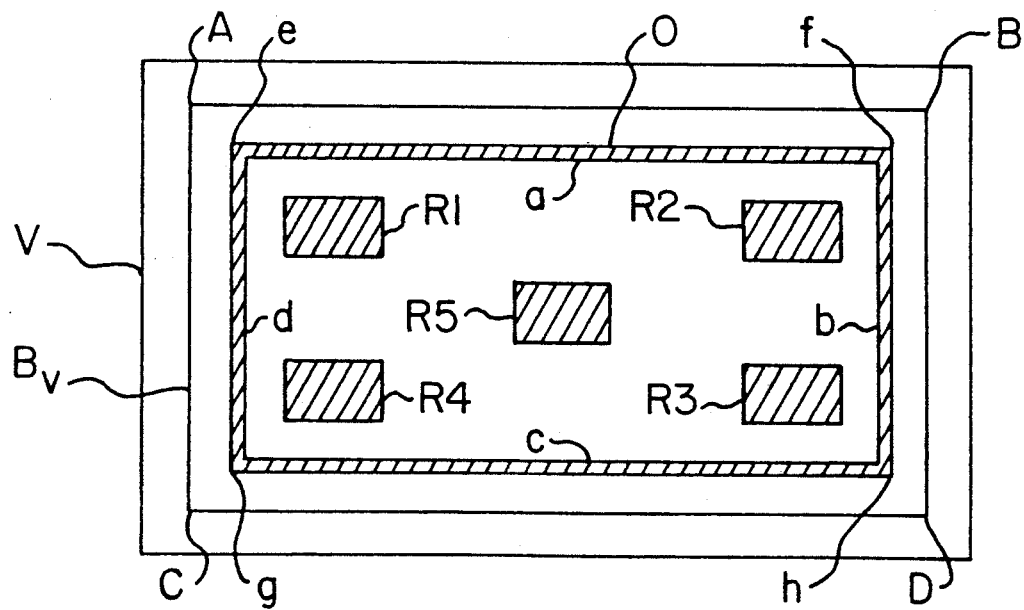
FIG. 10 illustrates the pattern used by the present invention to align a video monitor.

Further adjustment of the monitor being aligned/calibrated is effectuated by use of a plurality of rectangular patterns displayed on the monitor. FIG. 10 illustrates the pattern used by the present invention to align a video monitor 102. The graphics pattern generator 106 is signaled by the calibration computer 104 to send the predetermined pattern, as illustrated in FIG. 10, to the monitor. In an exemplary embodiment of the present invention, a pattern consisting of five relatively small rectangles (R1, R2, R3, R4, and R5) is generated and displayed inside of a larger rectangular frame F. The dimensions of these five rectangles are not critical and their location need only be approximately that shown in FIG. 10. The significant factor is that their desired size and location is precisely predetermined. This multi-rectangular pattern is used to align the monitor according to the method set forth below. It should be noted that either more than five, or fewer than five, rectangular patterns could be used to achieve acceptable results in a given situation, but the overall degree of alignment accuracy achieved when employing the present method is, up to a diminishing threshold, a function of the number of patterns employed and the technique used to discern them.

Because the pattern displayed on the monitor CRT 101 can appear within a wide range of locations (in an unadjusted monitor) inside the confines of the virtual bezel $B_v$, the calibration computer 104 attempts to identify boxes and lines within the video array V of the captured image displayed on the monitor, wherever, on the CRT 101, they occur.

Figure 11:
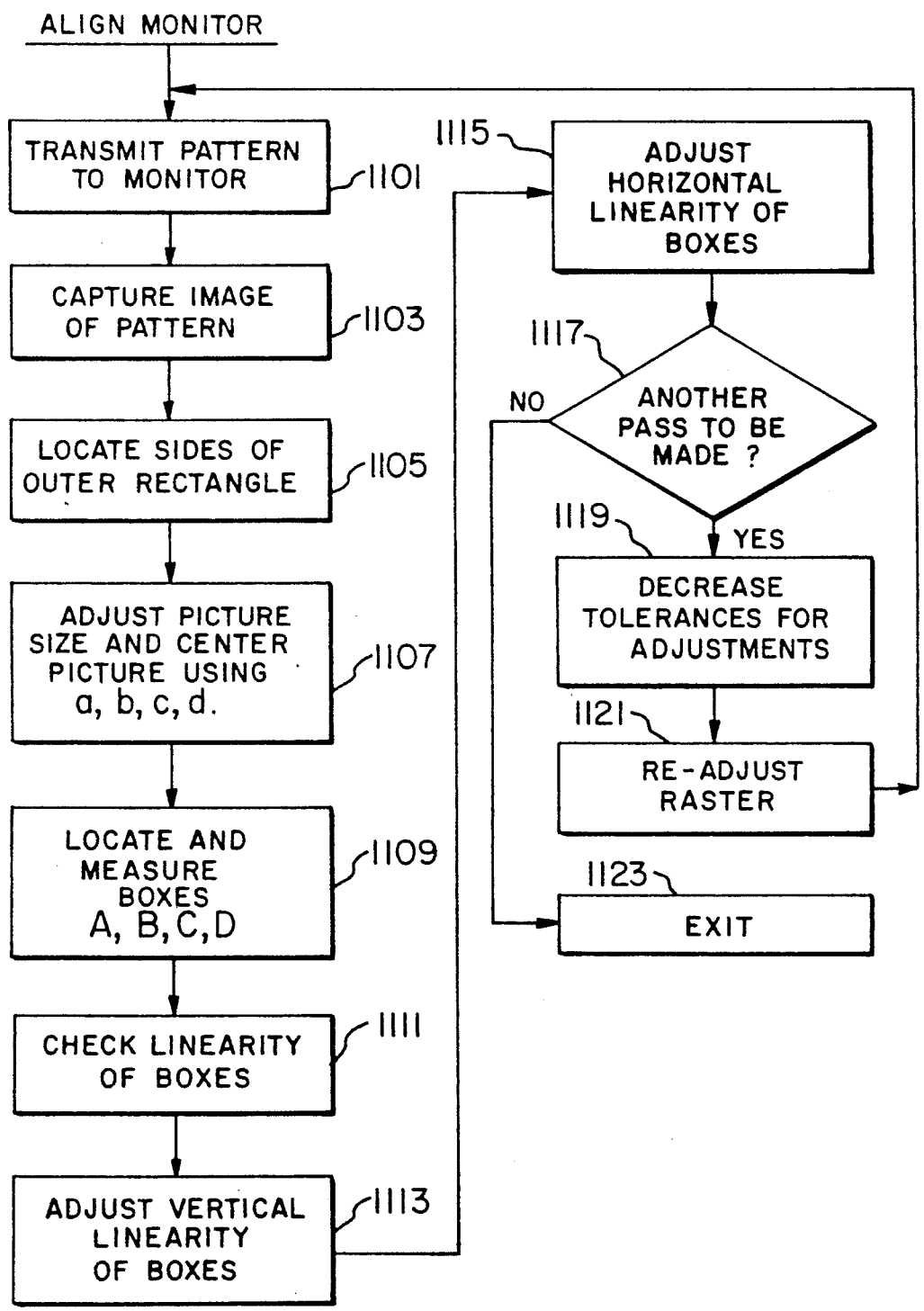
FIG. 11 is a flow chart of the method of the present invention for aligning a video monitor using the above-mentioned rectangular patterns.

FIG. 11 is a flow chart of the method of the present invention for aligning a video monitor 102 using the above-mentioned rectangular patterns. At step 1101, the pattern as shown in FIG. 10 is generated by the pattern generator 106 and transmitted to the monitor being aligned/calibrated. The pattern is displayed on the monitor and captured by the pickup camera 120, at step 1103, and stored in a video array V, represented by the rectangle V in FIG. 6. Next, at step 1105, sides e, f, g, and h, of the displayed outer rectangular frame F are located by measuring from the previously identified virtual bezel $B_v$, using either of the edge location techniques described above. At step 1107, the calibration computer 104 calculates the correct distance the edges a,b,c, and d should be located from the virtual bezel $B_v$ and makes adjustments to the appropriate monitor registers until the correct picture size, both horizontal and vertical, has been achieved. The lines are then centered within the bezel to achieve horizontal and vertical center. All four measurements are conducted, and appropriate corrections made, in a given step. Next, at step 1109, the five boxes, R1, R2, R3, R4, and R5 are located and measured using one of the edge detection techniques described above. Each of the boxes is located by scanning, in "typewriter" fashion, for a left vertical edge of the box. "Typewriter" scanning is accomplished by starting at a coordinate assumed to be located to the left and above the center of the box being located. Pixels in the video array V are scanned from left to right until a vertical edge is encountered, or a predetermined maximum distance is exceeded. If the maximum distance is exceeded before an edge is encountered, then the scanning is continued at coordinates located one pixel below, and at the lefthand origin of the present scan. The typewriter scan, of course, could originate on the right side of each box being located, with equal search efficacy. After the left vertical edge of each box has been located, the right vertical edge, and the top and bottom edges are readily located.

After the boxes have been located and measured, at step 1111, their horizontal and vertical component sizes are compared to each other for linearity. The vertical linearity of the boxes is then adjusted (via the corresponding monitor registers), at step 1113, until the boxes are of approximately the same vertical dimension. If the y (vertical) dimension of box R1 is different than the y dimension of box R2, then vertical linearity of the monitor is adjusted via the vertical linearity "C" and "S" registers until the y dimensions are equal. If the average y dimension of box R1 and box R3 is different than box R5, vertical shape is adjusted via the vertical linearity registers. All corrections for vertical linearity are made in the same step with the vertical size and center adjustments. If the x (horizontal) dimension of box R1 is different than box R2, the horizontal "S" correction register is adjusted, at step 1115, until horizontal linearity is achieved.

Two or more passes may be undertaken to adjust both raster and pattern, first, a coarse adjustment and then a fine adjustment. If it is determined, at step 1117, that more than one adjustment pass is to be made, then, at step 1119, the tolerances for raster adjustment and pattern alignment are made more stringent, i.e., decreased. If the present adjustment pass is the only (or the last) pass to be made, then the adjustment routine is exited at step 1123. Otherwise, at step 1121, the raster is readjusted (as described above), and the alignment routine is repeated, starting at step 1101. For multiple passes, the sequence of adjustment is coarse raster, coarse pattern, fine raster, fine pattern. The acceptable values for exiting the adjustment loop during coarse adjustment cycles are much less stringent than during fine adjustment cycles. Adjustments are typically conducted in two passes because of the interdependence of raster and picture adjustments. If the monitor cannot be adjusted in a given number of iterations it is failed.

In addition to the automatic adjustment mode, the raster and picture can also be adjusted manually. In manual mode, a graphic display 135 connected to the calibration computer 104 is used to indicate the alignment of the monitor relative to a set of target values. As manual adjustments are made, the graphic display 135 is updated to indicate the change towards or away from the target values.

The system 100 of the present invention also allows the user to see a "picture", on the graphic display 135, of what the pickup camera 120 is viewing. This facilitates rapid manual coarse alignment of the monitor and initial focus of the pickup camera 120.

DIGITAL CONTROL CIRCUIT

Figure 12:
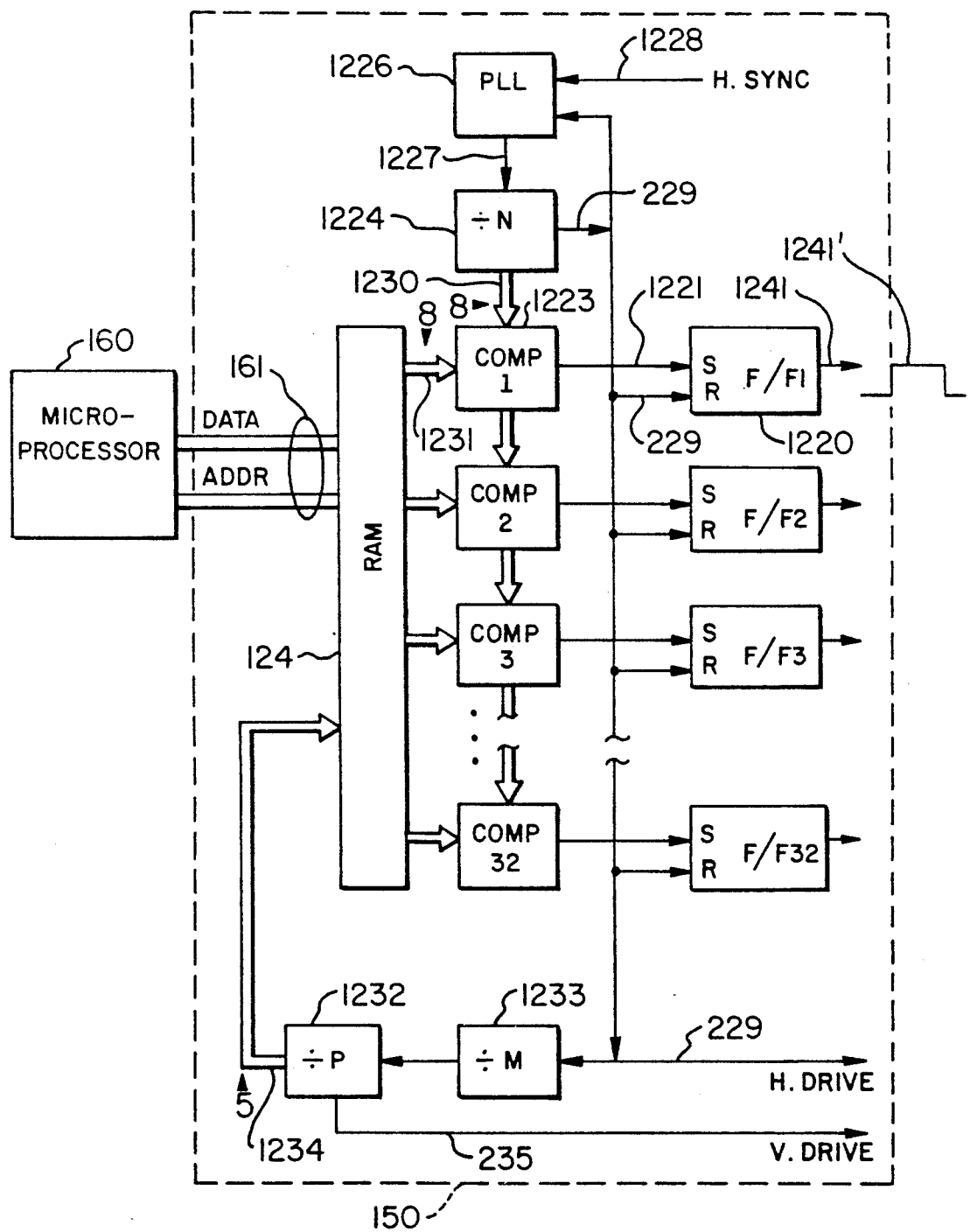
FIG. 12 illustrates in block diagram form the digital control circuit contained within the video display terminal.

FIG. 12 illustrates in block diagram form the digital control circuit 150 of the present invention. This circuit is an improved alternative to analog circuits used to effectuate control within a video monitor 102. The circuit illustrated in FIG. 12 is a voltage wave form generator which develops a pulse width modulated signal 1241' at the output terminal 1241 of a flip flop 1220. Note that although only a single flip flop/waveform is described in this example, a typical monitor using the system 100 of the present invention would have 16, 32, or more different outputs for controlling a corresponding number of monitor functions. The digital control circuit 150 thus employed would have a corresponding number (16, 32, . . . ) of flip flops (as well as comparators 1223, described below).

The waveform 1241 output by the flip flop 1220 is created by the action of two pulses. The first pulse is a reset pulse output on lead 229 by divide by N counter 1224. This reset pulse continuously resets flip flop 1220 to its normal high state while a second pulse (a set pulse) appearing on lead 1221 as output by comparator 1223 sets the flip flop to its low state whenever it arrives. In normal practice, a set pulse is received between every reset pulse. This closes the duty cycle of the output waveform 1241' produced by flip flop 1220 on lead 1241 to be established entirely by the relative position of the set pulse within the interval between adjacent reset pulses. In this manner, the circuit thus modulates the width of the output pulse. There is a preferred repetition rate for the reset pulse which repetition rate is a function of the horizontal sync signal within the video monitor 102. For the sake of example, assume that the repetition rate of the reset pulse is one hundred kilohertz. Furthermore, there is a preferred number of duty cycle states desired in the output waveform 1241' and this number is determined by the count number "N" used in counter 1224 which, for example is 256. Using these numbers, it is apparent that a drive frequency source of 25.6 megahertz is required.

Therefore, a phase lock loop 1226, in this example, produces the 25.6 megahertz master clock signal which is applied to the input of divider circuit 1224 on lead 1227. Divider circuit 1224 divides the input by 256 using eight stages of division, which full cycle is completed between adjacent carry (reset) pulses as applied to lead 229. The carry pulse on lead 229 from the divider circuit 1224 is applied to the reset input R of flip flop 1220, causing the flip flop 1220 to reset, in the present example, at a 100 kilohertz rate. The output of divider 1224 is applied via an 8 bit bus 1230 to comparator circuit 1223. A second input is applied via an 8 bit bus 1231 to comparator 1223 from dual port RAM memory 124. RAM memory 124 contains previously stored data used by the digital control circuit 150 to control the various static and dynamic functions of the associated video monitor 102. Each time the two eight bit numbers applied via bus 1230 and bus 1231 to comparator 1223 are equal, comparator 1223 produces a set pulse which is applied via lead 1221 to the set input S of flip flop 1220. This set pulse sets flip flop 1220 to a LOW state and establishes the desired duty cycle as its output waveform 1241' for a specific monitor control function.

The output frequency of the phase lock loop 1226 is established by the horizontal sync signal on lead 1228 which occurs within the video monitor 102. This signal is applied to phase lock loop 1226 as is the carry pulse on lead 229 from the divider circuit 1224. Both of these signals are used to perform synchronous lockup in the phase lock loop 1226 which results in well known fashion by the control voltage that is generated as a result of the frequency phase comparison between these two signals. The carry pulse on lead 229 is also carried forward and may be used as the horizontal drive reference pulse for the monitor. The carry pulse on lead 229 is also connected to a binary divider chain consisting of a divide-by-M circuit 1233 connected in series with a divide-by-P circuit 1232. "P" is a number equal to the number of sub-intervals during a complete vertical interval, at which sub-intervals the monitor display is to be controlled. The carry pulse from divide-by-P circuit 1232 on lead 235 may be used as the vertical drive reference pulse for the monitor 102. It should be noted that the two divider circuits 1232,1233 may be combined into a single divide-by-(M*P) circuit suitable for a given application.

The binary output of divide-by-P circuit 1232 is delivered via bus 1234 to RAM memory 124, and is used to sequentially poll, for a given sub-interval of a vertical scan interval, each of the registers associated with a comparator 1223. These registers are used to store data which is used to control a given monitor function "P" times per vertical interval. Each of the comparators 1223 is connected, via an 8 bit bus 1231, to a dedicated area of memory in RAM 124. Each of these dedicated RAM areas is divided into "P" 8-bit segments which function as the registers used to control specific monitor functions. For example, if P is equal to 32, then there are 32 "sets" of registers in RAM 124, as well as 32 comparators 1223, each register set/comparator pair being used to control one of 32 different functions in a given monitor. Each set of these 32 register sets thus has "P" component registers, one for each sub-interval of the CRT vertical interval to be controlled. Each time the binary number output on bus 1234 is incremented, the next sequential register in the register set corresponding to a given comparator 1223 is selected. When the data stored in the selected register (accessed via bus 1231) is equal to the data input to the comparator 1223 on bus 1230, a set pulse is sent to the associated flip flop 1220 on lead 1221, thus making it possible for the waveform output from the flip flop 1220 to change cyclically in synchronism with the incoming monitor signal source, which is typically the horizontal sync signal. The divide-by-P circuit 1232 is chosen to output a waveform 1241' which can be varied at a sufficient number of (i.e., P) sub-intervals during each full vertical interval of the CRT 101, such that the CRT display may be finely adjusted. Given that there are Q functions to be controlled, then there are Q comparators, and thus Q sets of registers, each having P registers to a set.

Figure 13:
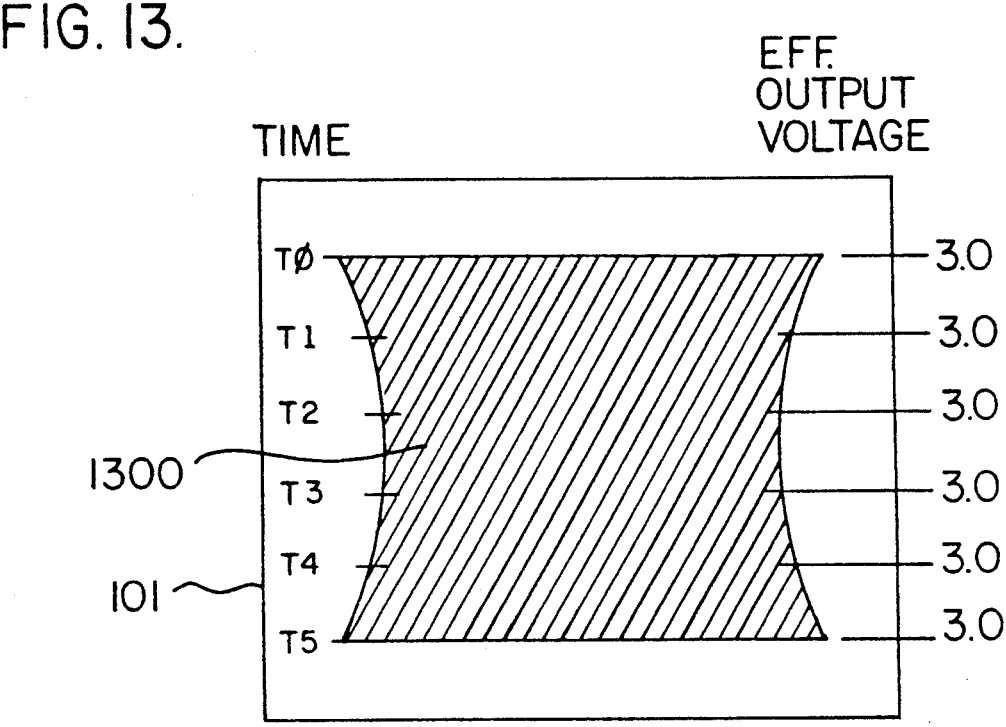
FIG. 13 illustrates an unaligned CRT displaying a pattern transmitted to the monitor by the pattern generator.
Figure 14:
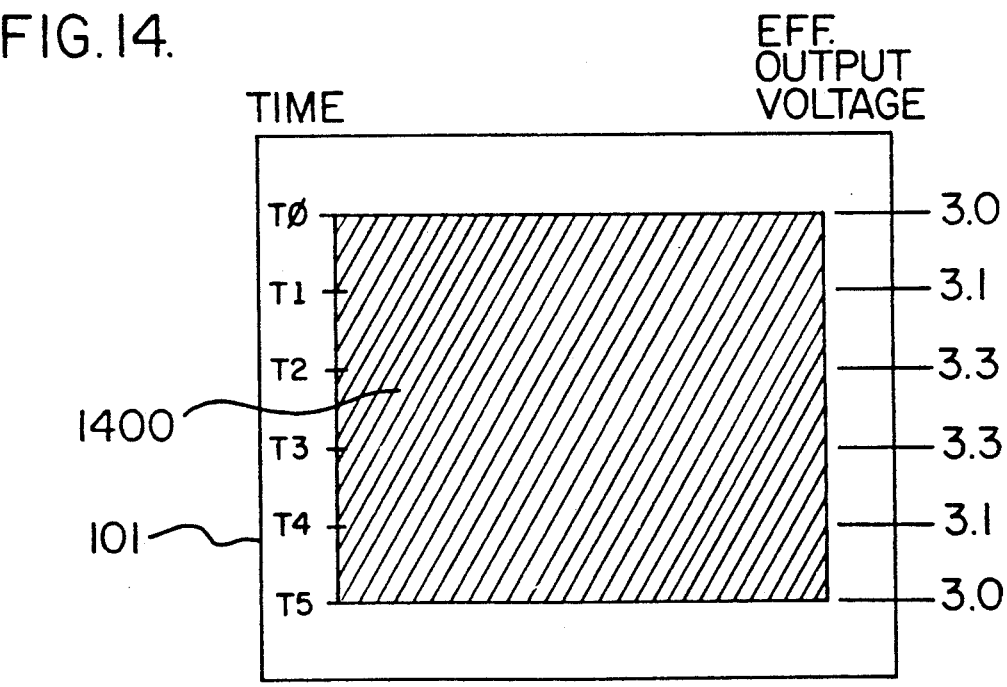
FIG. 14 shows the resultant pattern after the monitor has been aligned to compensate for the nonlinearity present in FIG. 13.

A simplified example of the effect such a waveform 1241' being output at P sub-intervals during a vertical interval is shown in FIGS. 13 and 14. In both FIGS. 13 and 14, the full vertical interval of the display is represented, on the left side of the display, by T0 to T5. Sub-intervals of the vertical interval are indicated by the intervals T0–T1, T1–T2 . . . T4–T5. Sub-interval T5–T0 is the time occupied by the retrace. The right side of the display indicates the effective output voltage of the Horizontal Size flip flop 1220 at the start of each of the intervals. FIG. 13 illustrates a CRT 101 displaying a pattern 1300 transmitted to the monitor 102 by the pattern generator 106. The pattern 1300 should appear as a rectangle having linear vertical edges (sides) when monitor 102 is properly adjusted. Note that, however, in this example, the middle portions of both vertical edges of the pattern 1300 are curved inward toward the center of the CRT 101. At the beginning of each of the sub-intervals, a pulse width modulated signal having an effective DC voltage is output from a flip flop 1220 in the digital control circuit 150. Assume, in this example, that there are 6 sub-intervals (thus P=6), and that the effective output voltage on the Horizontal Size flip flop lead 1241 is equal to 3 volts at the start of each interval T0 through T5.

In FIG. 14, the same pattern has been transmitted to the monitor 102 by the pattern generator 106 as in FIG.

13, but the resultant pattern 1400 has been compensated for, by adjusting the appropriate registers associated with the pincushion output ("PIN" in FIG. 2) from the digital control circuit 150. In FIG. 14, the registers corresponding to intervals T1 through T4 have been modified to increase the effective output voltage for each of those intervals, with a corresponding increase in the horizontal width of the displayed pattern 1400 between the intervals.

In a preferred embodiment of the present invention, other monitor functions, such as those listed in FIG. 2, are controlled and adjusted as in the foregoing example. As the size of the CRT is increased, the value of P may increased, with a corresponding increase in the number of comparators 1223, flip flops 1220, and associated registers, as more sub-intervals are required to fine-tune the monitor adjustment.

Although the divide-by-M circuit 1233 is shown to divide by the indeterminate number M, the actual number represented by M is chosen so as to make the product (M*P) equal to the number of scanning lines that occur in the vertical scanning interval of a particular video monitor 102. For example, if a monitor were to have 2016 scan lines from top to bottom of the screen, and P=32, then M would have to be 63, since 32*63=2016.

Prior art circuits providing pulse width modulated (PWM) digital to analog conversion typically run at a relatively low frequency (about 2 kHz), as they are normally free-running. Large capacitors are needed to filter the AC component of the output of the circuit. In many applications a three pole filter is needed. Any of the 2 kHz switching frequency left on the output affects the picture being displayed. The size of the picture thus is modulated at a 2 kHz rate, causing wavy lines along the edges of the displayed picture. The brightness of the picture also varies, causing wavy lines to run through the picture. Because of the large filter capacitors, the DC output voltage cannot be changed very fast. Resistors having a large values of resistance must thus be employed to remove the AC component. Unfortunately, the use of a large value resistor limits the amount of current that can be handled by the circuit. In addition, the output of prior art circuits often needs to be buffered.

Compared to the prior art, the digital control circuit 150 of the present invention is capable of running at a much faster monitor scan frequency. One important reason for this increased speed is the fact that the control circuit 150 is synchronized to switch only once per horizontal interval. This lower switching frequency allows the use of a much simpler filter than that required by the prior art. In addition, more power can be handled by the present circuit because the output resistor has a smaller value of resistance. Output buffering is not needed. A small value of capacitance is used to filter the circuit output, thus allowing the output voltage to be changed at a very fast rate. Of extreme importance is the fact that the output frequency of the digital control circuit 150 is the same as the horizontal frequency of the video monitor 102, thus avoiding interference problems associated with the prior art. In addition, the use of a digital memory enables the circuit of the present invention to produce control signals of greater flexibility than the previous analog control circuitry, e.g., the monitor display can be "fine-tuned" a plurality of times over each vertical interval. Furthermore, the use of the digital control circuit 150 provides a uniformity within the video monitor 102 that allows large scale integration (LSI) techniques to be used to implement control circuitry for a large number of parameters which heretofore have not been controllable in video monitors.

It is to be expressly understood that the claimed invention is not to be limited to the description of the above described embodiments but encompasses other modifications and alterations within the scope and spirit of the inventive concept.

We claim:

1. A system for calibration of a video monitor having a digital control circuit for controlling the display characteristics of a display on a cathode ray tube in response to an input signal comprising:

means for transmitting a signal indicative of a test pattern to said video monitor thereby causing an image of said test pattern to be displayed on said cathode ray tube;

a video camera for receiving said test pattern image from said cathode ray tube, wherein said test pattern image is processed as a non-color-separated image after said receiving thereof; and means, responsive to said test pattern image received by said video camera, for transmitting, to said digital control circuit, control data necessary to cause said test pattern image to conform to a predetermined image.

2. The system of claim 1, wherein said digital control circuit comprises:

memory for storing a set of digitally encoded control signal values, each of said control signal values corresponding to a target characteristic of said displayed image; and means, responsive to said control signal values stored in said memory, for outputting to said display, signals indicative of said control signal values.

3. The system of claim 1, wherein said calibration system further comprises:

means for generating a set of said video test patterns;

means for determining a difference between a given said received video image and a desired video image by comparing of said given received video image with each other; and means, responsive to said difference, for transmitting said control signal values to said digital control circuit to compensate for said difference by comparing parts of said given received video image with each other.

4. The system of claim 1, wherein said digital control circuit generates, seriatim, a target set of pulse-width modulated output signals in synchronism with an input signal, each of said output signals having a target value, and wherein said display generator controlling means further comprises:

memory for storing a set of digitally encoded control values, each of said control values corresponding to a said target value of said output signal;

means, responsive to said input signal, for generating a plurality of pulses, each of said pulses being in synchronism with said input signal;

means, responsive to a cyclicly selected one of said pulses, for selecting a next sequentially located one of digitally encoded control values; and means for generating a said pulse-width modulated output signal having a said target value corresponding to said selected control value.

5. The system of claim 2, wherein said digital control circuit outputs a waveform to said cathode ray tube, and wherein said digital control circuit comprises:
- a phase-locked loop circuit having a horizontal sync signal as a first input, a second input, an output, and a frequency adjusting means;
- a first divider having an input connected to said output of said phase-locked loop circuit, said divider circuit also having a first output and a second output, a reset output pulse being provided on said first output for every n cycles of a frequency applied to said input, said reset output pulse also being output to a horizontal drive circuit of said cathode ray tube, and a second output repeatedly providing seriatim, a binary representation of each number 1 through n, where n is an integer equal to a maximum number of duty cycle states in said output waveform;
- a comparator having a first input connected to said output of said memory, a second input connected to said second output of said first divider, and an output;
- a flip flop having a first input connected to said output of said comparator, a second input connected to said first output of said first divider, and an output providing said waveform to said cathode ray tube; and
- a second divider having an input connected to said first output of said first divider, a first output and a second output, said first output being connected to address RAM, and said second output being connected to a vertical drive circuit of said cathode ray tube.

6. A digital control circuit for controlling the display characteristics of a video monitor, said monitor having a CRT, said digital control circuit comprising:
- means for generating a pulse width modulated waveform;
- means for storing indicia of an effective voltage of said pulse width, each of said indicia corresponding to a target value of said pulse width at the start of a given time interval, said time interval being one of a predetermined number of said time intervals in a cycle equal to a synchronization interval of said CRT;
- means for varying said pulse width of said waveform, in response to said indicia stored by said storing means, at said start of each of said time intervals; and
- means for synchronizing said waveform with said synchronization interval of said CRT.

7. The digital control circuit of claim 6, further including:
- means, responsive to a displayed image on said CRT, for modifying said indicia of an effective voltage of said pulse width of said waveform for each of said time intervals.

8. The digital control circuit of claim 7, wherein said modifying means includes a monitor alignment system controlled by a remote computer.

9. A system for calibration of a video monitor, said system having a pattern generator connected to said video monitor for generating a displayed image of a predefined pattern on a cathode ray tube of said monitor, said monitor having a digital control circuit for controlling visual characteristics of said displayed image on said cathode ray tube in response to a control signal comprising:
- means for controlling said pattern generator;
- means for receiving a said displayed image from said video monitor, wherein said displayed image is processed as a non-color-separated image after said receiving thereof, and wherein each pixel in said non-color-separated image has value corresponding to a grey scale level; and
- means responsive to said received image, for transmitting a said control signal to said digital control circuit in order to cause said displayed image to conform, within predetermined tolerances, to a desired image.

10. A system for calibration of a video monitor having a cathode ray tube, said cathode ray tube having a virtual bezel circumscribing a display aperture of said cathode ray tube comprising:
- means for determining a position of said virtual bezel relative to an image thereof captured by a single video camera;
- first control means for adjusting a raster displayed on said cathode ray tube to within a predetermined set of tolerances relative to said virtual bezel;
- means for generating a test pattern, said test pattern having a plurality of rectangles disposed therein;
- means for transmitting said test pattern to said video monitor;
- means for displaying an image of said test pattern on said cathode ray tube of said video monitor;
- means for receiving said image of said test pattern via a single video camera;
- means for digitizing said received image of said test pattern;
- means for storing said digitized image of said test pattern;
- means for determining a size of each of said rectangles in said image of said test pattern; and
- second control means for adjusting, in response to said determined size of each of said rectangles in said image of said test pattern, a linearity of each of said rectangles, thereby causing said linearity of each of said rectangles to approximate, within predetermined tolerances, a predetermined linearity.

11. A method for controlling the display characteristics of a video monitor, said monitor having a CRT comprising the steps of:
- storing indicia of an effective voltage of a pulse width modulated waveform, each of said indicia corresponding to a target value of said pulse width at the start of a given time interval, said time interval being one of a predetermined number of said time intervals in a cycle equal to a synchronization interval of said CRT;
- generating, in response to said indicia stored by said storing means, said pulse width modulated waveform, at said start of each of said time intervals; and
- synchronizing said waveform with said synchronization interval of said CRT.

12. The method of claim 11, including the additional step of:
- modifying, in response to a displayed image on said CRT, said indicia of an effective voltage of said pulse width of said waveform for each of said time intervals.

13. A method for calibration of a video monitor having a cathode ray tube, said cathode ray tube displaying a raster, and having a virtual bezel circumscribing a display aperture of said cathode ray tube comprising the steps of:

(a) determining a position of said virtual bezel relative to an image thereof captured by a single video camera;

(b) generating a test pattern, said test pattern having a plurality of rectangles disposed therein;

(c) transmitting said test pattern to said video monitor;

(d) displaying an image of said test pattern on said cathode ray tube of said video monitor;

(e) receiving said image of said test pattern via a single video camera;

(f) adjusting, in response to said received image, a location of at least one of said rectangles in said test pattern to within predetermined tolerances relative to said virtual bezel; and (g) adjusting, in response to said received image, a linearity of at least one of said rectangles in said test pattern to a predetermined linearity, within predetermined tolerances.

14. The method of claim 13, including the additional step of:

adjusting, in response to said received image, a size and location of said raster relative to said virtual bezel, to within predetermined tolerances.

15. The method of claim 13, wherein said video monitor has a rectangular physical bezel delimiting said display aperture of said cathode ray tube, and wherein said virtual bezel is a rectangle bounded by the inside edges of said physical bezel.

16. The method of claim 15, wherein the step of determining said position of said virtual bezel includes:

illuminating said physical bezel in order to cause to appear, to said video camera, a differential in apparent luminosity between said bezel and said display aperture of said cathode ray tube;

capturing an image of said physical bezel and said display aperture via said video camera;

digitizing said captured image to create a video array, wherein each element of said video array represents a pixel of said image;

comparing, along vertical and horizontal axes of said video array, a relative intensity of adjacent pixels in said video array; and locating each edge of said virtual bezel by recording coordinates in said video array where said step of comparing detects a difference in said relative intensity of said adjacent pixels.

17. The method of claim 13, wherein said cathode ray tube has a viewing screen bounded by outside edges, and wherein said virtual bezel is a rectangle approximated by said outside edges of the viewing screen of said cathode ray tube.

18. The method of claim 17, wherein the step of determining said position of said virtual bezel includes:

adjusting said raster to a maximum vertical and horizontal size;

capturing an image of said raster and a background area outside of said raster via said video camera;

digitizing said captured image to create a video array, wherein each element of said video array represents a pixel of said image;

adjusting a brightness of said raster so as to cause a differential in luminosity between said raster and said background area, said differential being sufficient to cause a measurable difference between said raster and said background area in said video array;

comparing, along vertical and horizontal axes of said video array], a relative intensity of adjacent pixels in said video array; and locating each edge of said virtual bezel by recording coordinates in said video array where said step of comparing detects a difference in said relative intensity of said adjacent pixels.

19. The method of claim 13, wherein said raster and said virtual bezel each has four sides, and wherein the step of adjusting said location and said size of raster includes:

capturing an image of said raster via said video camera;

digitizing said captured image to create a video array, wherein each element of said video array represents a pixel of said image;

determining the location of each of said sides of said raster relative to a corresponding one of said sides of said virtual bezel; and adjusting at least one control register in said video monitor so as to cause a position and size of said raster to conform, within predetermined limits, to a desired position and size.

20. The method of claim 19, wherein said control register is selected from the group consisting of vertical height register, vertical center register, top width register, horizontal DC center register, center width register, bottom width register, and tilt register.

21. The method of claim 13, including the additional step of repeating steps (b) through (g) wherein said predetermined tolerances are decreased.

22. The method of claim 13, wherein said virtual bezel has four sides, and wherein the step of adjusting a linearity of at least one of said rectangles in said image of said test pattern relative to said virtual bezel includes:

digitizing said received image of said test pattern to create a video array, wherein each element of said video array represents a pixel of said image;

locating, in said video array, each said edge of said virtual bezel;

locating, in said video array, each edge of said one of said rectangles;

determining a distance from each of said sides of said virtual bezel to a corresponding one of said sides of said one of said rectangles; and adjusting each said determined distance until a desired vertical and horizontal linearity of said one of said rectangles is achieved within predetermined tolerances.

23. The method of claim 13, wherein the step of adjusting said linearity of at least one of said rectangles in said test pattern includes:

digitizing said received image of said test pattern to create a video array, wherein each element of said video array represents a pixel of said image;

locating, in said video array, each edge of each one of said plurality of said rectangles to provide vertical and horizontal coordinates of each one of said rectangles;

determining, for each one of said rectangles, by comparing the vertical and horizontal coordinates of a given one of said rectangles, a horizontal and a vertical dimension of each one of said plurality of said rectangles;

determining a horizontal and a vertical linearity of said test pattern by comparing the determined horizontal and vertical dimensions of at least one of said rectangles to the corresponding determined dimensions of at least one other of said rectangles; and adjusting said horizontal and vertical linearity of said video monitor until a desired vertical and horizontal linearity of each one of said plurality of said rectangles is achieved within predetermined tolerances.

24. The method of claim 23, wherein the step of locating a said edge of a said rectangle includes:

scanning said video array linearly, in a direction from an edge of said virtual bezel toward the interior thereof, until encountering a pair of adjacent pixels exhibiting a predetermined difference in intensity, the coordinates of the second encountered pixel of said pair of pixels defining a point on said edge of said rectangle.

25. The method of claim 23, wherein the step of locating a said edge of a said rectangle includes:

(a) adjusting a brightness level of a said rectangle to a predetermined reference pixel intensity;

(b) scanning said video array linearly, in a direction from an edge of said virtual bezel toward the interior thereof, until encountering a reference-level pixel exhibiting said predetermined reference pixel intensity;

(c) determining an intensity of an adjacent pixel scanned next previous to said reference-level pixel; and (d) interpolating between said intensity of said reference-level pixel and said adjacent pixel to yield an interpolated location of said edge, said interpolated location being situated between an edge separating said reference-level pixel from said adjacent pixel, and an opposite edge of said adjacent pixel, at a distance from said separating edge equal to the ratio of the intensity of said adjacent pixel to the intensity of said reference-level pixel, multiplied by a pixel-width.

26. The method of claim 25, wherein the step of locating a said edge of a said rectangle further includes:

storing said interpolated location of said edge as a first interpolated location;

linearly displacing a said rectangle being displayed on said cathode ray tube by a predetermined dither distance, said dither distance being less than a said pixel width;

repeating steps (b) through (d);

storing said interpolated location of said edge as a second interpolated location; and averaging said first interpolated location and said second interpolated location to produce a resultant location of said edge of said rectangle.

27. The method of claim 26, wherein the step of linearly displacing said rectangle includes moving said pattern via a signal from said pattern generator to said video monitor.

28. The method of claim 26, wherein the step of linearly displacing a said rectangle includes moving said pattern via a magnetic field applied to said cathode ray tube.

29. A method for calibration of a video monitor having a cathode ray tube, said video monitor having stored therein a plurality of values for controlling certain characteristics of a display on said cathode ray tube, said cathode ray tube displaying a raster, and having a virtual bezel circumscribing a display aperture of said cathode ray tube comprising the steps of:

(a) determining a position of said virtual bezel relative to an image thereof captured by a single video camera;

(b) generating a test pattern, said test pattern having a plurality of rectangles disposed therein;

(c) transmitting said test pattern to said video monitor;

(d) displaying an image of said test pattern on said cathode ray tube of said video monitor;

(e) receiving said image of said test pattern via single video camera;

(f) calibrating at least one of said stored values in response to said received image, thereby adjusting a linearity of at least one of said rectangles in said test pattern to within predetermined tolerances relative to said virtual bezel; and (g) calibrating at least one of said stored values in response to said received image, thereby adjusting the linearity of at least one of said rectangles in said test pattern to a linearity within predetermined tolerances.

30. The method of claim 29, including the additional step of:

calibrating at least one of said stored values in response to said received image, thereby adjusting a size and location of said raster relative to said virtual bezel, to within predetermined tolerances.

31. The digital control circuit of claim 30, wherein said modifying means includes a monitor alignment system controlled by a remote computer.

* * * * *